G. E. WYANT.
COW SHACKLE.
APPLICATION FILED OCT. 4, 1917.
1,266,370.
Patented May 14, 1918.
2 SHEETS—SHEET 1.
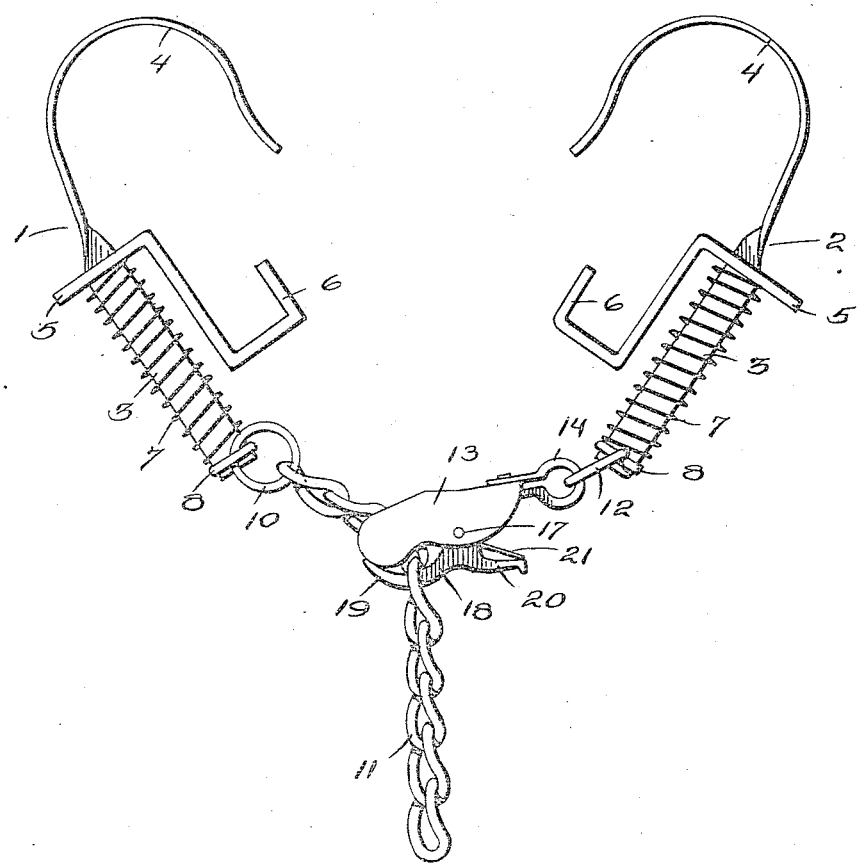
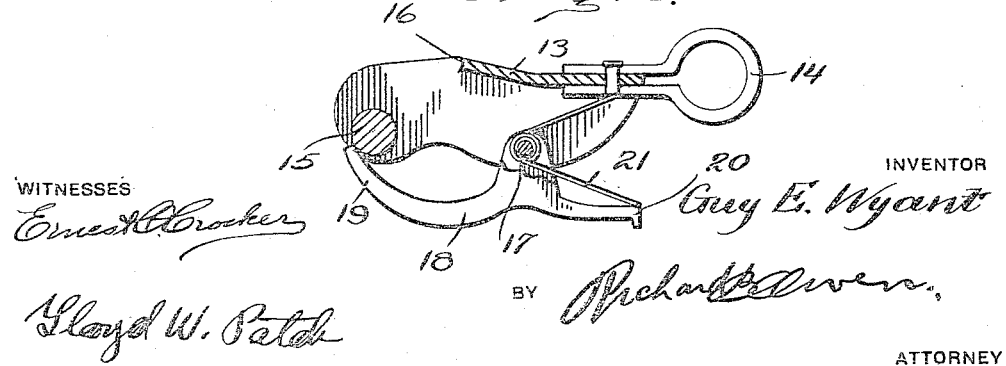
WITNESSES
INVENTOR
Guy E. Wyant
BY
ATTORNEY E. WYANT.
COW SHACKLE.
APPLICATION FILED OCT. 4, 1917.
1,266,370.
Patented May 14, 1918.
2 SHEETS—SHEET 2.
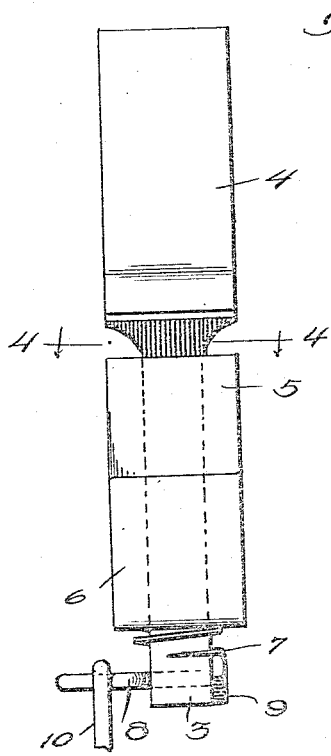
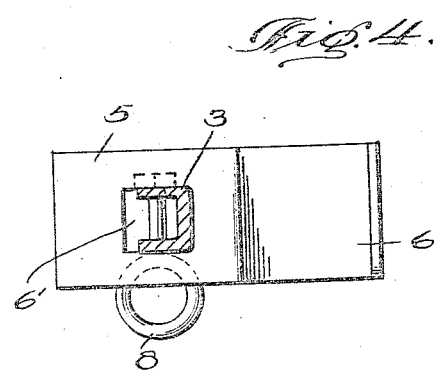
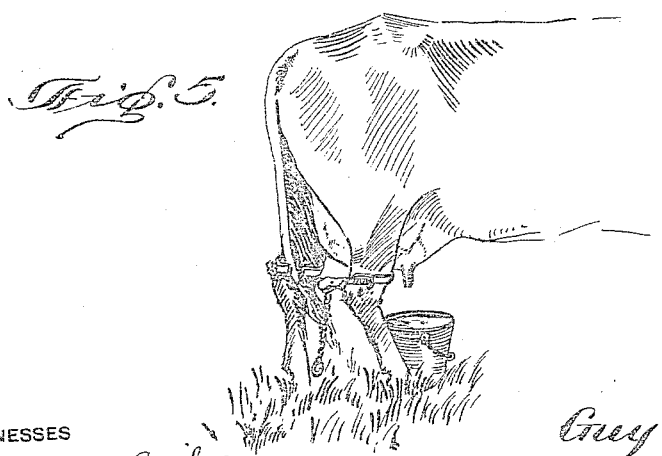
WITNESSES
INVENTOR
Guy E. Wyant
BY
ATTORNEY

UNITED STATES PATENT OFFICE.

GUY E. WYANT, OF SPRINGFIELD, OHIO.

COW-SHACKLE.

1,266,370.

Specification of Letters Patent. Patented May 14, 1918.

Application filed October 4, 1917. Serial No. 194,729.

*To all whom it may concern:*

Be it known that I, GUY E. WYANT, a citizen of the United States, residing at Springfield, in the county of Clark and State of Ohio, have invented certain new and useful Improvements in Cow-Shackles, of which the following is a specification.

This invention pertains to an improved cow shackle, and more particularly to a structure of this character intended for use by being fitted to the hind legs of a cow to restrain the animal and at the same time bar against kicking.

An object of my invention is to provide a device of the character described which is so constructed that it can be placed upon the cow's legs from the rear without the necessity of stooping, and while the animal is standing in any position, following which the legs will be drawn together, thus making the device one which is particularly well adapted for use upon vicious animals or kickers.

A further object resides in so shaping the means to be fitted to the legs that injury of the animal is guarded against, and in providing a chain by which said parts are connected together and are adjusted as to their distance of spacing, thus making it possible to use the device upon large and small animals, the chain by which the leg clips are connected being so joined therewith that drawing pressure is exerted upon the animal's legs from the rear, thus drawing the cow's legs apart in front and together at the back to make it possible to milk a cow having a large udder without the necessity of having one leg farther back than the other.

Yet another object is to so construct the clips to be fitted to the legs of the cow that they are of strong and of substantial character and automatically adjust to fit to the size of the particular animal to be restrained, while one of the clips can also be caught around or over the tail which will thus be held against that leg of the animal to which the clip is fitted, and positively eliminate the possibility of the tail being switched.

With the above and other objects in view, which will be in part described and in part understood from the specification, drawings, and claims, my invention consists in certain novel features of construction and combination of parts which will be hereinafter more fully set forth, In the drawings:—

Figure 1 is a view showing the leg holding clips and the chain substantially in the relation which they would assume in use;

Fig. 2 is a detail view with parts in section to better illustrate the chain holding lock;

Fig. 3 is a view of one of the leg engaging clips looking from the inner side thereof as these parts are shown in Fig. 1;

Fig. 4 is a sectional view taken on the line 4—4 of Fig. 3; and,

Fig. 5 illustrates the manner of using the shackle.

In its main parts the shackle comprises the leg clips, the chain, and the chain lock. The leg engaging clips 1 and 2 are substantially duplicates in all their parts, and therefore it will here be necessary to describe only one of the same. A shank 3 is provided with a hook shaped end 4, which is made sufficiently large to be received around the forward side of the hind legs of a cow just above the hocks. A clamping member 5 has an opening 6' provided therein through which the shank 3 is received, and this clamping member has its remaining end terminating in a hook 6 shaped to open substantially opposite the hook 4 and of such form that as the hook 4 is received around the forward side of the animal's leg, the hook 6 of the member 5 will fit around the cord of the animal's leg. A spring 7 is mounted around the shank 3 to bear at one end against the clamping member 5, and at its remaining end bears against an eye 8 which is passed through the shank 3, and a nut 9 mounted to secure this eye in place. The description above given applies equally well to the portions 1 and 2, with the exception that the eyes 8 are so disposed that when the two clip members are arranged to have the open sides of the hooks faced, these eyes will be disposed on the same side of each of the shanks. A ring 10 is connected in the eye 8 of one of the clip members and a link chain 11 is connected in this ring. The remaining clip member or portion has a ring 12 connected in the eye 8 thereof, and a lock case 13 is connected with this ring 12 by means of a strap metal piece 14. A cross bar 15 is provided at the free end of case 13, and clearance is left at 16 so that the chain 11 can be passed through the case 13 and snubbed around the cross bar 15. A shaft 17 is mounted across between the sides of the case 13, and a plunger 18 is pivotally mounted on this shaft and has a tongue 19 which extends up to abut against the cross bar 15. An arm 20 is provided on the plunger 18 by which the same may be swung around its pivotal mounting to raise the tongue 19 from its engagement against the cross bar 15, a spring 21 being provided to normally maintain this bearing engagement of the tongue, by exerting resilient force against the arm 20.

The device is assembled for use by passing the chain 11 through the clearance provided at 16 so that it is snubbed around the cross bar 15 and is held by the tongue 19 of the plunger 18, substantially after the manner shown in Fig. 1; however, when the shackle is about to be used it is preferable that a greater length of chain be let out from the lock case 13. In use, the two leg engaging clips 1 and 2 will be grasped so that one is held in each hand with the thumbs bearing against the lower ends of the shanks 3 while the first and second finger of each hand are engaged over the clamp member 5 where the same is mounted slidably upon the shank 3, and then by exerting bearing pressure against the members 5, they will be moved against the bearing pressure exerted by the springs 7 and the hooks 6 will be opened from the hooks 4, thus permitting the hooks 4 to be caught around the forward side of the legs of the cow just above the hocks, and then when the clamping members 5 are again released, the springs 7 will urge the same forward sufficiently that the hooks 6 will catch around the cords at the back of the animal's legs, and thus these clips will be secured against displacement, upon the legs of the animal. The free end of the chain 11 is then grasped and the chain is snubbed or drawn around the cross bar 15, the tongue 19 being moved back against the resilient force of the spring 21. As the lock case and the chain are connected with the extreme ends of the shank 3, the tendency will be to draw the animal's legs together at the back and to spread the same at the front, the clip portions taking substantially the position shown in Fig. 1, and as the tongue 19 will be forced through one of the open links of the chain 11, the parts will be positively secured and held in the adjusted position to which they have been brought. By slightly loosening one of the clamp members 5, so that the hook portion 6 thereof is moved somewhat from the leg of the animal, and then inserting strands of the tail between the animal's leg and the hook portion 6, the member 5 will close down against the tail and will positively hold and grip the same against being switched.

From the foregoing it will be seen that I have provided a cow shackle which is of such character that it can be inexpensively manufactured and in which parts will fit readily upon the hind legs of an animal to accomplish restraining action, while at the same time positively precluding possibility of injury to the animal, and also it will be noted that the structure is such that the device is adapted for use upon various sizes of animals and to accomplish various degrees of restraint, while the drawing force is exerted upon the animal's legs in such a way as to pull back the legs and leave the udder exposed to facilitate milking.

While I have herein shown and described only certain specific forms and constructions of the various parts, it will be understood that changes and variations might be resorted to, and hence I wish to be limited to only such points as may be set forth in the claims.

I claim:

1. A cow shackle including a pair of clip portions each of which consists of two hook members slidably connected together and means to resiliently move one of said hook members toward the other so that the clip portions can be fitted to and will hold upon the hind legs of an animal, and means by which said clip portions are connected together.

2. A cow shackle including a pair of clip portions each of which consists of a large hook having a shank extending therefrom with a clamping member mounted slidably upon the shank and provided with a small hook facing toward the large hook, springs mounted around the shanks to resiliently force the small hooks toward the large hooks of the clips portions, and means connected with the shanks by which the clip portions may be drawn together.

3. A cow shackle including a pair of clip portions each of which consists of a large hook having a shank extending therefrom with a clamping member mounted slidably upon the shank and provided with a small hook facing toward the large hook, springs mounted around the shanks to resiliently force the small hook toward the large hook of the clip portions, a lock connected with the shank of one of said clip portions, and a chain connected at one of its ends with the shank of the remaining clip portion and adapted to have its free end passed through the lock to connect the two clip portions together.

4. A cow shackle including a pair of clip portions each comprising a large hook having a shank extending therefrom, clamp members slidably mounted on the shanks and provided with small hooks facing toward the large hooks, eyes mounted at the free ends of the shanks, coil springs placed around the shanks to bear against the clamp members and the eyes, a lock casing connected with the eye of one of the clip portions and provided with a cross bar, a chain connected with the remaining clip portion passed through the lock casing around the cross bar, a plunger member movably mounted in conjunction with the lock casing and provided with a tongue to be received through the links of the chain, and a spring normally urging said plunger member to a position that the links of the chain are held against displacement from the tongue.

In testimony whereof I affix my signature in presence of two witnesses.

GUY E. WYANT.

Witnesses:
C. S. OLINGER,
R. A. GARLOUGH.

Copies of this patent may be obtained for five cents each, by addressing the "Commissioner of Patents, Washington, D. C."